United States Patent
Buhler et al.

(10) Patent No.: US 6,404,741 B1
(45) Date of Patent: Jun. 11, 2002

(54) MONITORING OF A PACKET TELEPHONY DEVICE VIA A CONTROL DEVICE

(75) Inventors: Gerhard Buhler, Little Silver; Christos Polyzois, Chatham Township, Morris County, both of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/640,798

(22) Filed: Aug. 18, 2000

Related U.S. Application Data

(63) Continuation of application No. 08/787,669, filed on Jan. 24, 1997, now Pat. No. 6,128,285.

(51) Int. Cl.⁷ .............................. G06F 1/26; G06F 11/00
(52) U.S. Cl. .................... 370/244; 379/93.07; 713/324
(58) Field of Search ................................. 370/241, 242, 370/243, 244, 245, 246, 250, 252, 352, 356, 389; 379/93.01, 93.07, 93.14; 340/825.06, 825.16; 711/162; 714/6, 47, 25; 707/204; 713/324, 310, 320, 340

(56) References Cited

U.S. PATENT DOCUMENTS

| | | | | |
|---|---|---|---|---|
| 5,565,856 A | * | 10/1996 | Takaba et al. | 370/242 |
| 5,757,777 A | * | 5/1998 | Tanaka | 370/342 |
| 6,032,236 A | * | 2/2000 | Honda | 711/162 |
| 6,163,849 A | * | 12/2000 | Nouri et al. | 713/324 |

\* cited by examiner

*Primary Examiner*—Huy D. Vu
*Assistant Examiner*—Phuongchau Ba Nguyen
(74) *Attorney, Agent, or Firm*—Kenyon & Kenyon

(57) ABSTRACT

A control device attached to both a primary packet device (such as a PC-based packet phone) and a network (e.g., telephone network or packet network) provides improved reliability for packet telephony and network maintenance. The control device may have its own network address separate from that of the packet telephony device. The control device enables monitoring of the operation of the packet telephony device and basic maintenance, such as re-booting of that device if it is no longer responding to input commands.

49 Claims, 4 Drawing Sheets

MONITORING OF A PACKET TELEPHONY DEVICE VIA A CONTROL DEVICE

CROSS-REFERENCE TO RELATED APPLICATIONS

This application is a continuation of application Ser. No. 08/787,669 filed Jan. 24, 1997, issued as U.S. Pat. No. 6,128,285, which is included herein in its entirety by reference thereto.

TECHNICAL FIELD

This invention relates to packet telephony in general and, more particularly, provides a way of increasing reliability of and extending network management and operations to end devices for packet telephony.

BACKGROUND OF THE INVENTION

Packet telephony involves the use of a packet network, such as the Internet or an "intranet" (modeled in functionality based upon the Internet and used by a companies locally or internally) for telecommunicating voice, pictures, moving images and multimedia (e.g., voice and pictures) content. Instead of a pair of telephones connected by switched telephone lines, however, packet telephony typically involves the use of a "packet phone" or "Internet phone" at one or both ends of the telephony link, with the information transferred over a packet network using packet switching techniques. A "packet phone" or "Internet phone" typically includes a personal computer (PC) running application software for implementing packetized transmission of audio signals over a packet network (such as the Internet); in addition, the PC-based configuration of a packet or Internet phone typically includes additional hardware devices, such as a microphone, speakers and a sound card, which are plugged or incorporated into the PC.

Furthermore, packet telephony includes a broad spectrum of media or signal types. Whereas the plain old telephone service (POTS) networks have primarily been concerned with sound (and, over the last several years, data) transmission, packet telephony includes—in addition to voice/data—pictures or images, moving pictures, and multimedia content. Incorporating the capability of handling multimedia content increases the complexity of end devices for packet telephony.

Regular telephone devices used with POTS networks are simple, highly reliable devices. Users typically do not tamper with them during the life of the telephone. The reliability of regular telephones is limited only by the manufacturing process.

In contrast, devices used for packet telephony, such as PC-based packet phones, are dynamically-configured machines, with operation controlled (and resources allocated) in part by one or more executable software programs, And much more complex in their operation with higher hardware failure rates. In addition, PCs used for packet phones are not dedicated telephony devices, so the reliability of a PC-based packet phone may well be limited by other applications that may run on the PC; for example, a crash caused by any other application that renders the PC inoperative (i.e., the computer is "hung") would also render the PC-based packet phone inoperative. While some PC products contain as a feature the ability of a PC to wake up, receive a phone call and go back to sleep, such a feature requires an operational PC; if the PC has crashed, the "wake up" phone call feature will be rendered inoperable.

While consumers have become accustomed to failures in computers and PC equipment, they have not been accustomed to failures in their telephones; in fact, consumers have become accustomed to a highly reliable, ubiquitous telephone service that has been available for years through POTS. The shift in telephony from POTS networks and telephones to packet networks and PC-based packet telephony devices, thus, brings about the need for increased reliability in packet telephony devices.

What is desired is a practical way to improve the reliability of packet telephony devices, such as a PC-based packet phone, so that the reliability of network communications through packet telephony approaches the reliability of POTS telephony.

SUMMARY OF THE INVENTION

An illustrative embodiment of the present invention is directed to a control device operationally coupled to both a packet telephony device (such as a PC-based packet phone) and a communications network (e.g., telephone network or packet network). The control device may have its own network address separate from that of the packet telephony device. The control device enables monitoring of the operation of the packet telephony device and basic maintenance, such as rebooting of that device if it is no longer responding to input commands.

DETAILED DESCRIPTION

A. Introduction to Illustrative Embodiments

Figure 1:
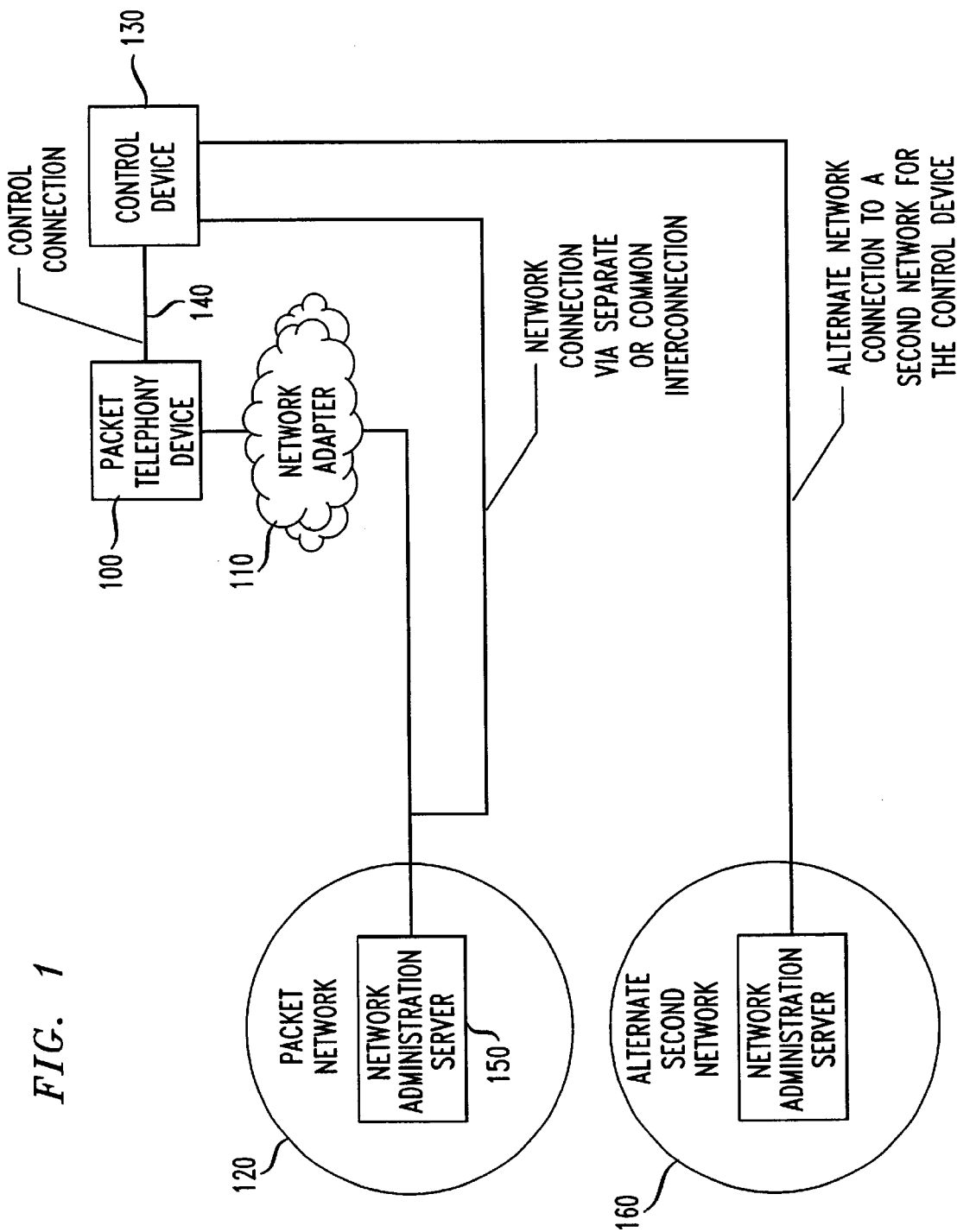
FIG. 1 is a functional diagram illustrating the interconnection between various components used in packet telephony in accordance with the present invention.

Embodiments of the present invention enable monitoring of a packet telephony device, such as a PC-based packet phone, and basic maintenance of that device, such as re-setting or re-booting the packet telephony device if it is no longer responding to input commands.

The invention comprises connection of a control device to both a packet telephony device and a network (e.g., the public switched telephone network or the Internet). For example, the packet telephony device may be a computer (e.g., a PC) attached to a network for computer-computer communications (e.g., an Ethernet or a token-ring) via a network adapter (e.g., a LAN access card or a dial-up voiceband data connection). Network packets destined for the packet telephony device are sent to its network address or, where present, the network address of the adapter.

The control device may have its own network address, separate from that of the packet telephony device, so that the control device can send and receive information even when the packet telephony device is no longer responding to input commands. The control device may also have the same address as the packet telephony device, however such a configuration may not provide the same level of robustness as would be the case with separate addresses.

The control device monitors the operation of the packet telephony device (e.g., status, faults, etc.) through a control connection between the packet telephony device and the control device, for the purpose of detecting a condition of inoperability. The control device can also apply basic maintenance functions (e.g., reset or boot, cycle power, etc.).

The monitoring of the packet telephony device can be done in many ways. For example, the packet telephony device could write certain data, e.g. a time stamp, on a regular or periodic basis into, e.g., a memory or register accessible by the control device, and the control device would check the same memory or register periodically, to ensure that the packet telephony device is functioning properly (i.e., making progress). In this example, the control device would detect a condition of inoperability with respect to the packet telephony device if, in checking the memory or register, it found that the packet telephony device had not written the expected data into the memory or register.

The control device could also monitor operation of the packet telephony device by observing whether or not the packet telephony device is sending responsive signals to the network or to the control device; such a responsive signal could include any type of signal that would ordinarily be sent by the packet telephony device in response to one or more signals received by the packet telephony device from the network or from the control device. A cessation of such responsive signals coming from the packet telephony device would indicate that the packet telephony device is inoperable.

The control device uses its own network connection to report information about the packet telephony device and receive control commands intended for the packet telephony device. For maximal fault-tolerance, the control device should use a separate network or channel (in addition to a separate adapter, if an adapter required). For example, the control device and the packet telephony device may be attached to separate Ethernets. For an ISDN connection, the control device could use the D-channel, while the packet telephony device could use the B-channel(s). For a POTS-type connection, control via voice band encoded control signals is possible. The control device could further be connected both to a network or channel separate from the packet telephony device as well as to the same network or channel connected to the packet telephony device.

In its operation, the control device will typically have simple, well-tested software. Furthermore, changes to that software will be very rare and under strict control of the network administrator; software updates could be downloaded over the network. Keeping the software operating on the control device less susceptible to modification (e.g., by use of micro-code) makes it more robust. In contrast, the packet telephony device is vulnerable to crashes which may result from updates of software unrelated or related to packet telephony. To ensure that the packet telephony device returns to a controllable state after being re-booted by the control device, the packet telephony device may be configured to re-boot with only the absolutely necessary software when it is instructed to do so by the control device. Thus, the control device may command the packet telephony device to re-boot or reset with such limited operational functionality. This could ensure that the possibly offending software does not get automatically restarted.

An Illustrative Embodiment

Referring to FIG. 1, the embodiment will now be described in more detail. FIG. 1 illustrates the functional role of the various network components with respect to the embodiment. Packet telephony device 100 is connected through network adapter 110 to network 120. Control device 130 is connected to network 120, and is also connected to the packet telephony device through control connection 140. Both the primary and the control device are attached to a network so that they can exchange data and commands with other functional units in the network. Packet telephony device 100 and control device 130 need not be connected to the same network; packet telephony device 100 and control device 130 may be connected to different networks, or even different types of networks, without sacrificing the advantages of the present invention. For example, packet telephony device 100 may be connected to a packet network, such as the Internet, while the control device may be connected to another packet network 160 (such as an intranet). Such a configuration would allow, for example, control of commonly-owned packet phones that are connected to the outside world via the Internet using control devices that are administered through a commonly-owned corporate intranet. Alternatively, the packet telephony device could be connected to a fiber network, while the control device is connected to a wireless network.

Continuing with FIG. 1, network administration server 150 is a remote network-based server that acts to administer the network. Network server 150 can retrieve information and apply control operations to the packet telephony device, which can be accomplished either directly between network server 150 and packet telephony device 100 or via control device 130. Of course, in certain circumstances, such as when the packet telephony device is not operating, control of the packet telephony device will only be possible through the direct interface between the control device and the packet telephony device.

Figure 2A:
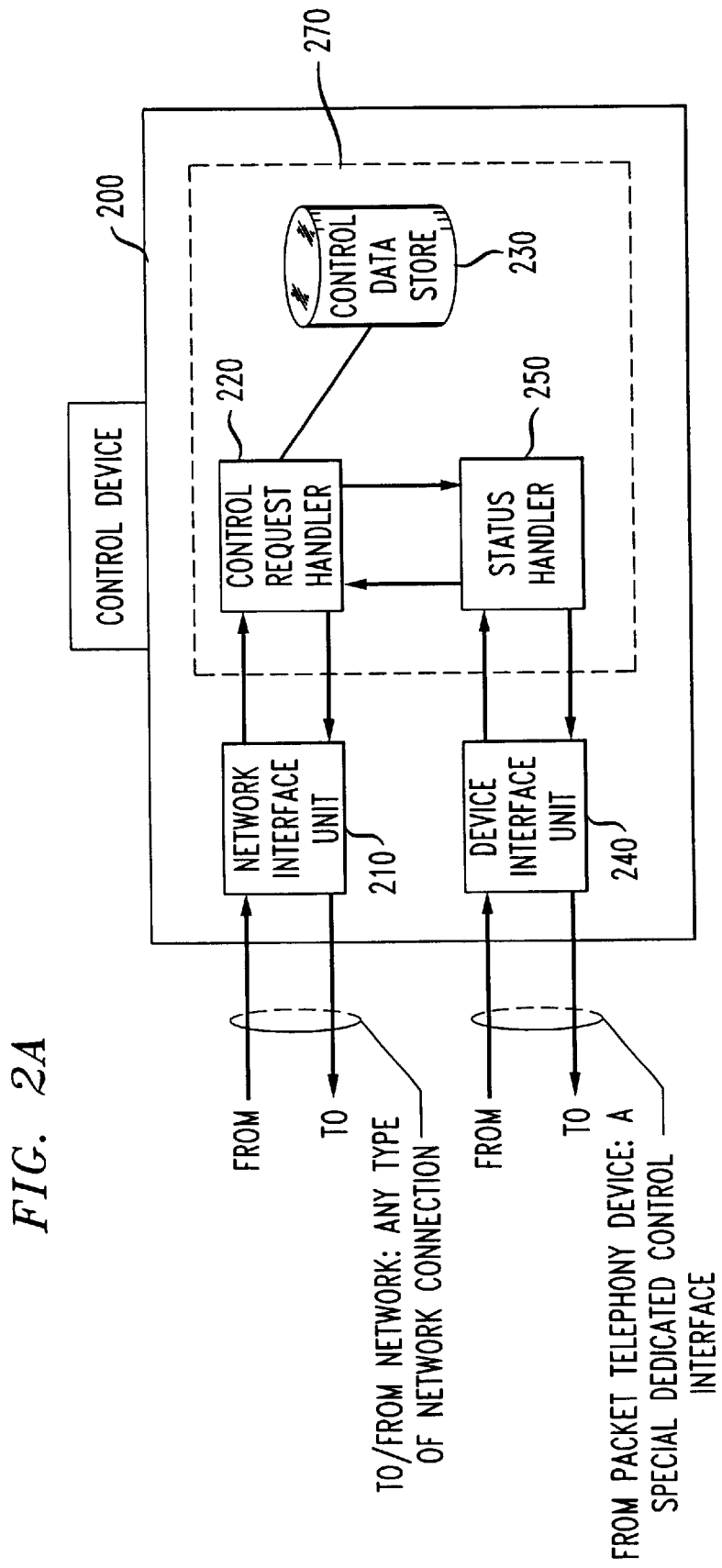
FIGS. 2A and 2B show two embodiments of a control device in accordance with the present invention.

FIG. 2A illustrates a structure for an embodiment of the control device in accordance with the present invention. The control device 200 (which is shown as 130 in FIG. 1) includes network interface unit 210 that makes it accessible via a network (e.g., network 120 from FIG. 1). Network interface unit 210 may be constructed as any number of possible combinations of hardware and/or software that implement the operation of providing an interface for the control device with the network. For example, if the control device is attached to an Ethernet network, network interface unit 210 will be an Ethernet-compatible interface unit. The network interface unit 210 in combination with control request handler 220 will execute the hardware/software protocols necessary for communication with other entities on the network. Control request handler 220 also implements the main logic for receiving requests from the network (via the network interface), processing such requests, and sending replies.

Control data store 230 is a data store including a memory element used to store code and/or data, and also loadable threshold data for automated control device intervention. The control data storage device 230 can be any of a number of known memory units, such as a disk, flash-ram, processor-resident memory, a PROM or any other kind of suitably-defined memory.

Device interface unit 240 is the interface that connects the control device 200 to the packet telephony device (100 in FIG. 1). This interface may include a serial or a parallel port, etc. Status handler 250 operates under the control of the control request handler 220. For example, if the control request handler 220 determines that it must re-boot the packet telephony device, it instructs the status handler 250 to output the appropriate signals to the packet telephony device via device interface unit 240.

Controlling the power on the packet telephony device (100, FIG. 1), such as turning it on and off, could in principle be done by sending appropriate control signals to the packet telephony device over the connection between the packet telephony device and the control device via device interface unit 240. This would allow the power management system on the packet telephony device to take appropriate action (e.g., save something on disk). However, because the packet telephony device may be hung, it may not respond to signals received via interface 240 from the control device 200.

Figure 2B:
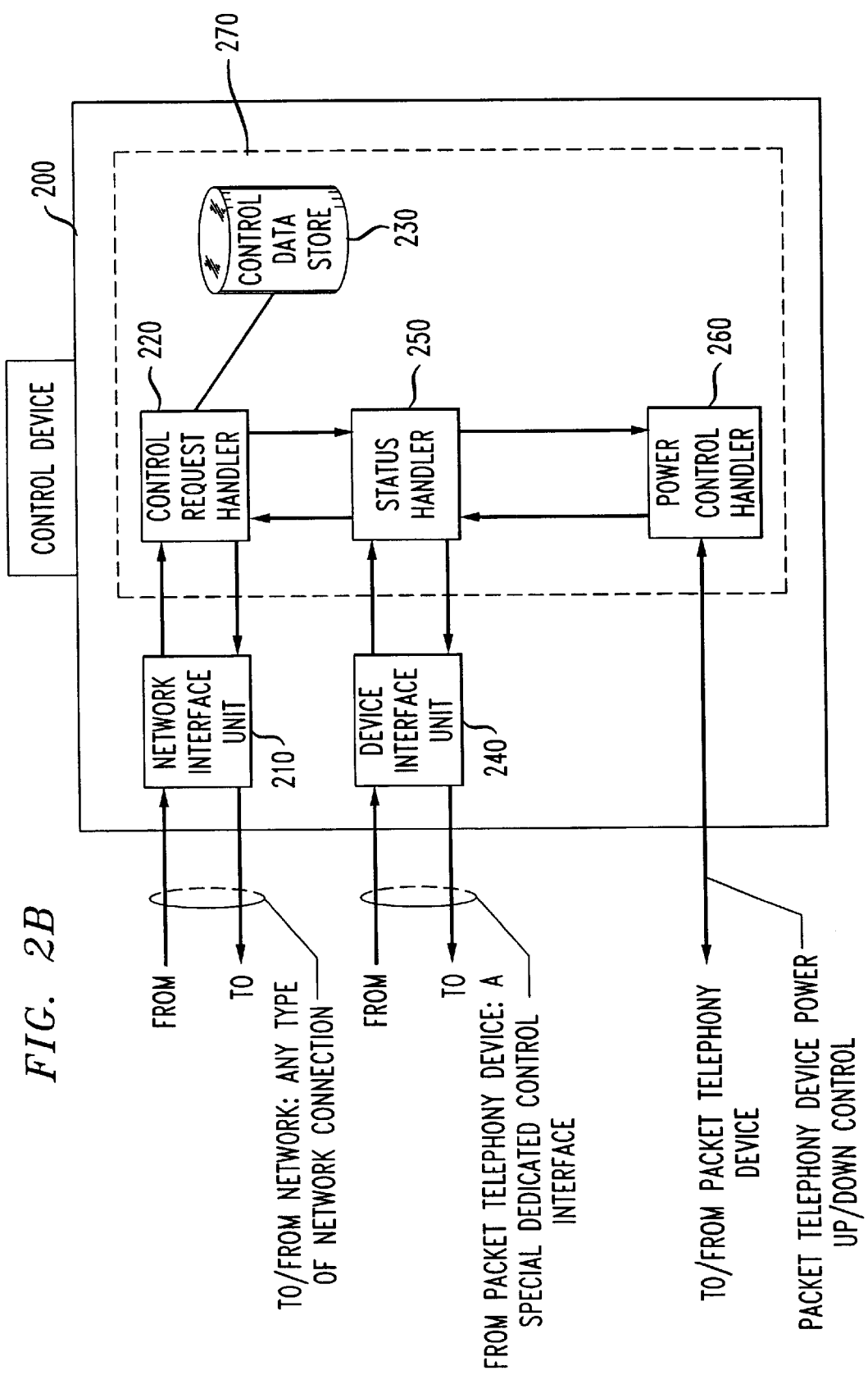

To solve this potential problem, control device 200 may, as shown in an alternate embodiment of the control device in FIG. 2B, include a separate power control handler 260 to control power on the packet telephony device directly. Power control handler 260 would include the necessary associated logic for controlling the power to the packet telephony device, as commanded by control request handler 220 and status handler 250. Those skilled in the art will recognize that, in many conditions, the re-setting effect of turning the packet telephony device power off and on can be accomplished, effectively, by triggering a logical reset through a connection between power control handler 260 and a logical reset input within the packet telephony device, such as that typically included with microprocessors or microcomputers used in PCs or other computer-based devices.

One potential problem may arise if a full reset, or re-boot, of the packet telephony device is initiated. It is possible that the re-boot may retrigger the condition that had rendered the packet telephony device fully or partially inoperable. For example, the packet telephony device may be a PC-based packet phone which is also programmed to run other non telephony-related software, which software is the cause of the PC entering the hung state; re-booting the PC may cause the offending software to be executed again and re-create the hung scenario. As an alternative to attempting a full re-boot of the packet telephony device, a special command or series of commands can be issued, through device interface unit 240 or through power control handler 260, to initiate a limited restoration of operation of the packet telephony device so that the device manages only a limited set of functions. To. continue with the packet telephone example above, device interface unit 240 or power control handler 260 can issue a special command (or set of commands) which would initiate a limited re-boot of the PC, such that only telephony-related functions of the PC would be enabled. Alternatively, the packet telephony device could be configured such that any attempt to reset or re-boot that comes directly from power control handler 260 would result in the limited function reset described above.

Control request handler 220, status handler 250, control data store 230 and, with respect to the alternative embodiment described above, power control handler 260 are, in combination, the logic unit (depicted as 270 in FIGS. 2A and 2B) for the control device of the present invention. Those skilled in the art will recognize that control request handler 220, status handler 250 and, where present, power control handler 260 included with logic unit 270 could be implemented using one or more logic circuits or one or more programmable processors that are programmed to implement the functions for each handler, as described above, or a combination of logic circuits and processors; and further that control data store 230 could, as described above, include a separate memory element or be included as part of a logic circuit and/or processor.

Figure 3:
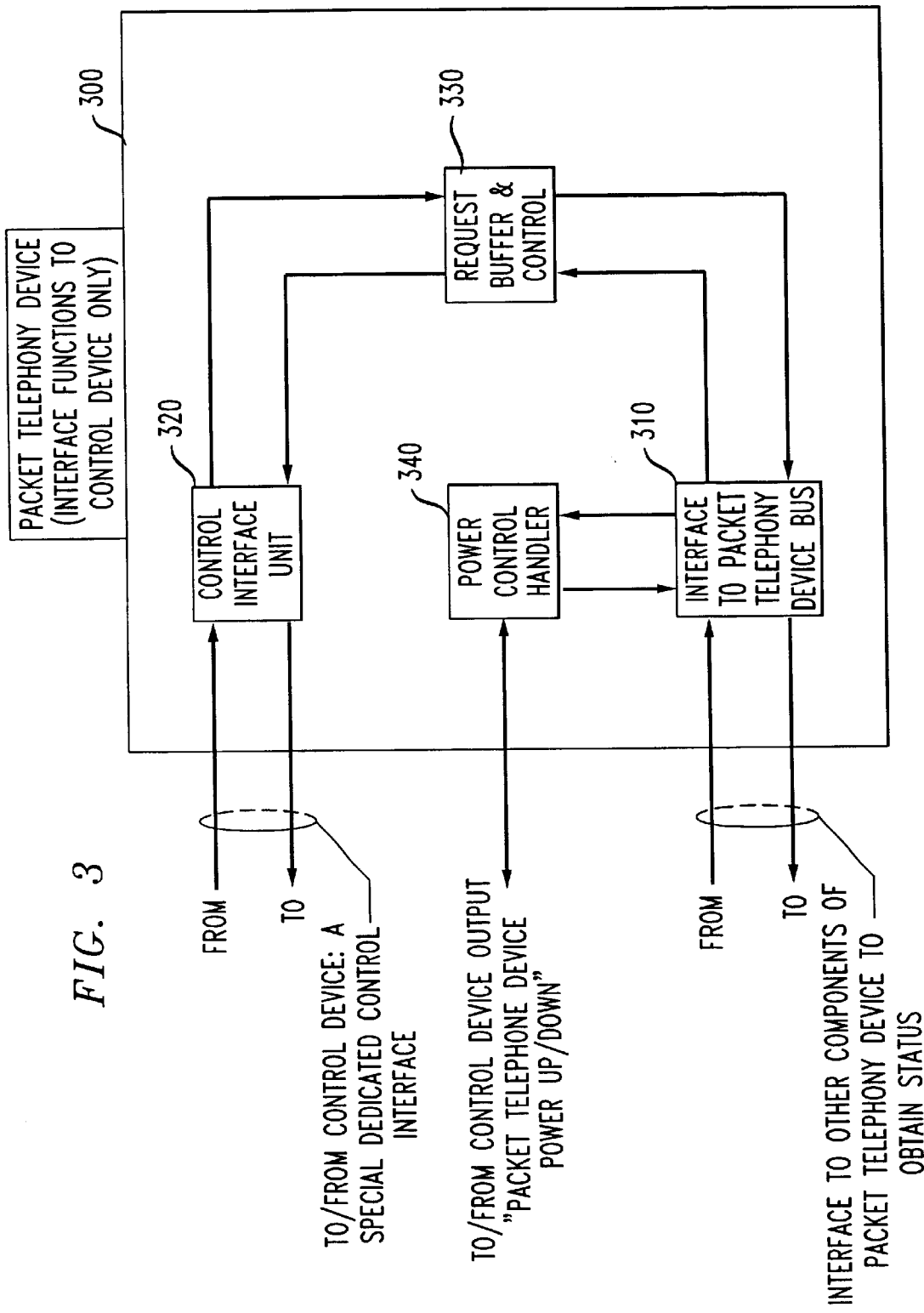
FIG. 3 shows a structure for functions incorporated in a primary device in accordance with the present invention.

Turning now to FIG. 3, illustrated in that figure are the components of the packet telephony device that are relevant to the present invention. Interface to packet telephony device bus 310 is the component that allows the functional components of FIG. 3 to communicate with the rest of the packet telephony device's components (not shown in FIG. 3). Control interface unit 320 is a special dedicated interface for connecting the packet telephony device to the control device of FIGS. 2A and 2B (which control device is also shown as 100 in FIG. 1). Through control interface unit 320, the packet telephony device reports status information to the control device and receives control commands from the control device. Request buffer and control 330 handles the logic for communications between the packet telephony device and the control device.

Power control handler 340 is the component that controls power to the packet telephony device. In one embodiment of the present invention, power control handler 340 connects internally to the packet telephony device and may receive commands from the control device through the path consisting of control interface unit 320, request buffer and control 330, and interface to primary bus 310. Alternatively, there could be a path directly from control interface unit 320 or from request buffer and control 330 to power control handler 340.

Through one of these equivalent control paths, power would normally be controlled by the control device. Thus, if the control device instructed the packet telephony device to shut down, it would preferably do so by sending a command through one of the above-enumerated pathways, so that the control logic within the power control handler 340 would decode the command and shut down, possibly after causing appropriate action to take place (e.g., save current status or memory on disk).

Another embodiment of the present invention includes (in conjunction with the embodiment shown in FIG. 2B above) a separate control line that comes into the power control handler directly from the control device; this is essentially in function a power on/off switch or a power reset control line. Because of the hung device scenario mentioned above, it may be preferable to include this direct power reset control so that the packet telephony device can successfully be restarted even if it is non-responsive to other external controls. Implementation of the functions of FIG. 3 may be accomplished, for example, by using an adapter card that attaches to the packet telephony device's system bus.

In order to lower the cost of this configuration, another embodiment of the present invention combines the control device with the regular primary network adapter. In this embodiment, the control device is, essentially, built or installed into the primary network. Such a configuration would sacrifice some of the fault tolerance (e.g, a single adapter failure could render both the primary and the control devices inaccessible). The combined device adapter would respond to two addresses (where the control device has an address separate from that of the packet telephony device) such that packets destined for the packet telephony device would be passed on following the normal route, while packets addressed to the control device would be intercepted and interpreted locally by the micro-code running on the combined device.

Similarly, in yet another embodiment of the present invention, the control device is combined with the packet telephony device itself (i.e., built or installed into the packet telephony device). This configuration also sacrifices some of the fault tolerance as, e.g., a single power failure could render both the packet telephony device and the control device inoperable.

Those with experience and skill in the art will readily appreciate that network security methods in the prior art can be used to ensure only authorized access to the control device. Those with experience in the art will also readily appreciate that the primary and the control devices do not need to be supported by the same power source. The control device might be a standalone battery powered device or might be supported by the POTS network power—much like a POTS handset is today. Such a configuration may be particularly useful to ensure continuous connectivity even in the presence of line power failures or when a PC crashes, making the packet phone inaccessible. The latter may be a consideration, since a PC-based packet phone will be limited by the unreliability of the host PC, such that a reliable second access to the network may be critical.

Those skilled in the art will further recognize that re-setting or re-booting of the packet telephony device when it becomes inoperable, in accordance with the present invention, is a form of basic maintenance of the packet telephony device, and that other forms of basic maintenance activities, such as updating programmable elements or features of the packet telephony device, are also enhanced by present invention. Thus, software updates intended, e.g., for a packet phone can be scheduled and implemented by the control device in a way that minimizes interruption of the availability of the packet phone.

The benefits of the present invention can be extended to other primary network devices used in connection with communications networks. Large numbers of computer-based primary network devices (such as, e.g., private branch exchange communications equipment or any other form of network terminal) are attached to these networks. It is often the case, however, that a computer-based primary network device has entered a state in which it is no longer capable of normal operation (e.g., it has crashed), and may require manual intervention. Also, it may not be easily determinable whether the fault has been the result of a network or adapter failure or the result of a computer crash. Accordingly, a control device may be utilized in conjunction with a primary network device in accordance with the methods and architectures described above with respect to packet telephony devices, in order to obtain improvements in reliability and network management for primary network devices similar to those that may be obtained for packet telephony devices.

In summary, the present invention describes a way of improving the reliability of packet telephony using a control device attached to both a packet telephony device (such as a PC-based packet phone) and a network (e.g., telephone network or packet network). The control device enables monitoring of the operation of the packet telephony device and basic maintenance (such as re-booting) of that device if it is no longer responding to input commands.

What has been described is merely illustrative of the application of the principles of the present invention. Other arrangements and methods can be implemented by those skilled in the art without departing from the spirit and scope of the present invention.

What is claimed is:

1. A method for improving the reliability of a packet telephony device coupled to a packet network using a control device, comprising the steps of:
   a. monitoring the operability of the packet telephony device by periodically observing a pattern of regular expected activity by the packet telephony device, wherein the regular expected activity includes writing data into at least one of a memory or a register, said memory or register being accessible by the control device;
   b. detecting a condition of inoperability of the packet telephony device by determining that the packet telephony device has stopped writing data into said memory or register; and
   c. initiating the re-setting of the packet telephony device so that it resumes operability.

2. The method of claim 1, wherein initiating the re-setting of the packet telephony device so that it resumes operability includes one of the steps of interrupting and then restoring the power for the packet telephony device or triggering a power reset control input for the packet telephony device.

3. The method of claim 1, wherein initiating the re-setting of the packet telephony device so that it resumes operability includes commanding the packet telephony device to enter a state of limited operational functionality.

4. The method of claim 3, wherein initiating the re-setting of the packet telephony device so that it resumes operability includes commanding the packet telephony device to enter a state of operational functionality limited to telephony-related functions.

5. The method of claim 4, wherein the step commanding the packet telephony device to enter a state of operational functionality limited to telephony-related functions is accomplished by triggering a power reset control input for the packet telephony device.

6. The method of claim 1, wherein the packet telephony device is configured to enter a state of limited operational functionality whenever the control device initiates the re-setting of the packet telephony device to resume operability.

7. The method of claim 1, wherein the packet telephony device is configured to enter a state of operational functionality limited to telephony-related functions whenever the control device initiates the re-setting of the packet telephony device to resume operability.

8. A method for improving the reliability of a packet telephony device coupled to a packet network using a control device, comprising:
   a. monitoring the operability of the packet telephony device, wherein the monitoring step includes at least one of observing responsive signals sent by the packet telephony device to the network, or observing responsive signals sent by the packet telephony device to the control device, or observing a pattern of regular expected activity by the packet telephony device;
   b. detecting a condition of inoperability of the packet telephony device, wherein the detecting step includes at least one of determining that the packet telephony device has ceased sending responsive signals to the network, or determining that the packet telephony device is not sending responsive signals to the control device, or determining that the packet telephony device is not engaging in a pattern of regular expected activity;
   c. initiating the re-setting of the packet telephony device so that it resumes operability; and
   d. scheduling software updates for the packet telephony device to minimize interruption of the availability of the packet telephony device.

9. The method of claim 8, wherein initiating the re-setting of the packet telephony device so that it resumes operability includes one of interrupting and then restoring the power for the packet telephony device or triggering a power reset control input for the packet telephony device.

10. The method of claim 8, wherein initiating the re-setting of the packet telephony device so that it resumes operability includes commanding the packet telephony device to enter a state of limited operational functionality.

11. The method of claim 10, wherein initiating the re-setting of the packet telephony device so that it resumes operability includes commanding the packet telephony device to enter a state of operational functionality limited to telephony-related functions.

12. The method of claim 11, wherein the step commanding the packet telephony device to enter a state of operational functionality limited to telephony-related functions is accomplished by triggering a power reset control input for the packet telephony device.

13. The method of claim 8, wherein the packet telephony device is configured to enter a state of limited operational functionality whenever the control device initiates the re-setting of the packet telephony device to resume operability.

14. The method of claim 8, wherein the packet telephony device is configured to enter a state of operational functionality limited to telephony-related functions whenever the control device initiates the re-setting of the packet telephony device to resume operability.

15. A method for improving the reliability of a packet telephony device coupled to a packet network using a control device, comprising:
   a. monitoring the operability of the packet telephony device;
   b. detecting a condition of inoperability of the packet telephony device;
   c. initiating the re-setting of the packet telephony device so that it resumes operability,
      wherein said control device is coupled to the packet telephony device and to at least one of the packet network and a second network other than said packet network, and said control device includes a logic unit configured to execute said monitoring, detecting and initiating steps; and
   d. scheduling software updates for the packet telephony device to minimize interruption of the availability of the packet telephony device.

16. The method of claim 15, wherein initiating the re-setting of the packet telephony device so that it resumes operability includes one of interrupting and then restoring the power for the packet telephony device or triggering a power reset control input for the packet telephony device.

17. The method of claim 15, wherein initiating the re-setting of the packet telephony device so that it resumes operability includes commanding the packet telephony device to enter a state of limited operational functionality.

18. The method of claim 17, wherein initiating the re-setting of the packet telephony device so that it resumes operability includes commanding the packet telephony device to enter a state of operational functionality limited to telephony-related functions.

19. A method for improving the reliability of a primary network device coupled to a network using a network control device, comprising:
   a. monitoring the operability of the primary network device by periodically observing a pattern of regular expected activity by the primary network device, wherein the regular expected activity includes writing data into at least one of a memory or a register, said memory or register being accessible by the network control device;
   b. detecting a condition of inoperability of the primary network device by determining that the primary network device has stopped writing data into said memory or register; and
   c. initiating the re-setting of the primary network device so that it resumes operability.

20. The method of claim 19, wherein initiating the re-setting of the primary network device so that it resumes operability includes one of interrupting and then restoring the power for the primary network device or triggering a power reset control input for the primary network device.

21. The method of claim 19, wherein initiating the re-setting of the primary network device so that it resumes operability includes commanding the primary network device to enter a state of limited operational functionality.

22. The method of claim 21, wherein initiating the re-setting of the primary network device so that it resumes operability includes commanding the primary network device to enter a state of operational functionality limited to telephony-related functions.

23. The method of claim 22, wherein the step commanding the primary network device to enter a state of operational functionality limited to telephony-related functions is accomplished by triggering a power reset control input for the primary network device.

24. The method of claim 19, wherein the primary network device is configured to enter a state of limited operational functionality whenever the network control device initiates the re-setting of the primary network device to resume operability.

25. The method of claim 19, wherein the primary network device is configured to enter a state of operational functionality limited to telephony-related functions whenever the network control device initiates the re-setting of the primary network device to resume operability.

26. A method for improving the reliability of a primary network device coupled to a network using a network control device, comprising:
   a. monitoring the operability of the primary network device, wherein the monitoring step includes at least one of observing responsive signals sent by the primary network device to the network, or observing responsive signals sent by the primary network device to the network control device, or observing a pattern of regular expected activity by the primary network device;
   b. detecting a condition of inoperability of the primary network device, wherein the detecting step includes at least one of determining that the primary network device has ceased sending responsive signals to the network, or determining that the primary network device is not sending responsive signals to the network control device, or determining that the primary network device is not engaging in a pattern of regular expected activity;
   c. initiating the re-setting of the primary network device so that it resumes operability; and
   d. scheduling software updates for the primary network device to minimize interruption of the availability of the primary network device.

27. The method of claim 26, wherein initiating the re-setting of the primary network device so that it resumes operability includes one of interrupting and then restoring the power for the primary network device or triggering a power reset control input for the primary network device.

28. The method of claim 26, wherein initiating the re-setting of the primary network device so that it resumes operability includes commanding the primary network device to enter a state of limited operational functionality.

29. The method of claim 28, wherein initiating the re-setting of the primary network device so that it resumes operability includes commanding the primary network device to enter a state of operational functionality limited to telephony-related functions.

30. The method of claim 29, wherein the step commanding the primary network device to enter a state of operational functionality limited to telephony-related functions is accomplished by triggering a power reset control input for the primary network device.

31. The method of claim 26, wherein the primary network device is configured to enter a state of limited operational functionality whenever the network control device initiates the re-setting of the primary network device to resume operability.

32. The method of claim 26, wherein the primary network device is configured to enter a state of operational functionality limited to telephony-related functions whenever the network control device initiates the re-setting of the primary network device to resume operability.

33. A control device for monitoring a packet telephony device coupled to a packet network, comprising:
   a. a network interface unit that connects the control device to at least one of the packet network and a second network other than said packet network;
   b. a logic unit coupled to the network interface unit, comprising a control request handler, a status handler and a data store; and
   c. a device interface unit coupled to the logic unit that connects the control device to the packet telephony device;
      wherein said logic unit is configured to monitor the operability of the packet telephony device, detect a condition of inoperability of the packet telephony device, and initiate the re-setting of the packet telephony device so that it resumes operability.

34. The control device of claim 33, wherein the packet network includes at least one of the Internet or an intranet.

35. The control device of claim 33, wherein the packet telephony device is a packet telephone.

36. The control device of claim 33, wherein at least one of the network interface unit, the logic unit or the device interface unit is physically housed in the packet telephony device.

37. The control device of claim 33, wherein the logic unit includes a processor programmed to undertake the tasks of at least one of the control request handler or the status handler.

38. The control device of claim 33, wherein the logic unit is configured to initiate the re-setting of the packet telephony device by issuing a command to reset the packet telephony device to a state of limited operational functionality.

39. The control device of claim 33, wherein the control device has an address that is different from an address of the packet telephony device.

40. The control device of claim 33, wherein the logic unit further comprises a power control handler that connects the control device to a power reset control of the packet telephony device.

41. The control device of claim 40, wherein the logic unit includes a processor programmed to undertake the tasks of at least one of the control request handler, the status handler or the power control handler.

42. The control device of claim 40, wherein the logic unit is configured to initiate the re-setting of the packet telephony device by issuing a command to reset the packet telephony device via the power reset control of the packet telephony device.

43. The control device of claim 40, wherein the logic unit is configured to initiate the re-setting of the packet telephony device by issuing a command to reset the packet telephony device to a state of limited operational functionality via the power reset control of the packet telephony device.

44. The control device of claim 40, wherein the control device has an address that is different from an address of the packet telephony device.

45. The control device of claim 33, wherein the control device is combined with a network adapter coupled to the packet network and to the packet telephony device.

46. The control device of claim 33, wherein power is supplied to the control device through at least one of the packet network and the second network.

47. The control device of claim 33, wherein the logic unit is configured to be responsive to software maintenance requirements of the packet telephony device.

48. The control device of claim 33, wherein said logic unit is configured to monitor the operability of the packet telephony device by periodically observing a pattern of regular expected activity by the packet telephony device, wherein the regular expected activity includes writing data into at least one of a memory or a register, said memory or register being accessible by the control device; and wherein said logic unit is configured to detect a condition of inoperability of the packet telephony device by determining that the packet telephony device has stopped writing data into said memory or register.

49. The control device of claim 33, wherein said logic unit is configured to monitor the operability of the packet telephony device by periodically observing at least one of responsive signals sent by the packet telephony device to the network, or responsive signals sent by the packet telephony device to the control device, or a pattern of regular expected activity by the packet telephony device; and wherein said logic unit is configured to detect a condition of inoperability of the packet telephony device by determining at least one of that the packet telephony device has ceased sending responsive signals to the network, or that the packet telephony device is not sending responsive signals to the control device, or that the packet telephony device is not engaging in a pattern of regular expected activity.

* * * * *